United States Patent [19]
Kadota

[11] Patent Number: 6,086,510
[45] Date of Patent: Jul. 11, 2000

[54] ENGINE-OUTPUT CONTROL UNIT

[75] Inventor: Yoichi Kadota, Tokyo, Japan

[73] Assignee: Mitsubishi Denki Kabushiki Kaisha, Tokyo, Japan

[21] Appl. No.: 09/244,103

[22] Filed: Feb. 4, 1999

[30] Foreign Application Priority Data

Aug. 25, 1998 [JP] Japan .................................. 10-238226

[51] Int. Cl.⁷ ............................................... B60K 41/04
[52] U.S. Cl. .......................................... 477/107; 477/111
[58] Field of Search .................................. 477/107, 110, 477/111; 701/54

[56] References Cited

U.S. PATENT DOCUMENTS

| | | | |
|---|---|---|---|
| 3,375,740 | 4/1968 | Bottum | 477/107 X |
| 4,694,798 | 9/1987 | Kato et al. | 123/339 |
| 4,962,570 | 10/1990 | Hosaka et al. | 180/197 X |
| 5,023,792 | 6/1991 | Shioyama | 701/97 |
| 5,048,372 | 9/1991 | Sodeno et al. | 477/111 X |
| 5,199,326 | 4/1993 | Iwatsuki et al. | 477/98 |
| 5,496,230 | 3/1996 | Ando et al. | 477/111 |
| 5,601,512 | 2/1997 | Scag | 477/111 |

FOREIGN PATENT DOCUMENTS

2-201061  8/1990  Japan .

*Primary Examiner*—Charles A Marmor
*Assistant Examiner*—Roger Pang
*Attorney, Agent, or Firm*—Sughrue, Mion, Zinn, Macpeak & Seas, PLLC

[57] ABSTRACT

To control rise of an engine output when performing backward driving with the back gear, the opening degree of a throttle valve for adjusting the air quantity to be taken into the engine is controlled so that it does not increase when the transmission is set to the back gear state.

6 Claims, 11 Drawing Sheets

ENGINE-OUTPUT CONTROL UNIT

BACKGROUND OF THE INVENTION

1. Field of the Invention

The present invention relates to an engine-output control unit provided with an electronic-control throttle system for electronically controlling the opening degree of a throttle valve for adjusting the air quantity to be taken into an engine in accordance with operational information including engine speed and gear information.

2. Description of the Prior Art

A conventional vehicle controls the output of an engine by mechanically operating a throttle valve set in the intake pipe of the engine in accordance with the accelerator control input of a driver and thereby, adjusting the intake air quantity of the engine.

Because recent engines are computerized, an electronic-control throttle system such as one disclosed in the Japanese Patent Laid-open No. 201061/1990 is noticed which electronically operates a throttle valve by electrically detecting an accelerator control input (opening degree of accelerator). The electronic-control throttle system computes the target torque of an engine in accordance with an accelerator opening degree, vehicle speed, and engine speed, operates the throttle valve with an electric motor, and controls the output of the engine.

Because this type of the electronic-control throttle system can accurately control an intake air quantity for determining the combustion state of an engine, it is used, for example, for advanced engine combustion control for clearing various gas regulations becoming stricter year by year. That is, by controlling the air quantity to be taken into an engine by the electronic-control throttle system in addition to conventional control of fuel quantity to be supplied to an engine, it is possible to accurately control an air-fuel ratio (ratio of air quantity to be taken into an engine to fuel quantity to be supplied to the engine) greatly influencing the characteristics of the gas exhausted from the engine. Therefore, it is possible to realize a combustion state corresponding to a driving state, reduce the amount of exhaust gas, and control an engine output corresponding to a vehicle running state or driver's manipulation. Thus, it is possible to optionally set output control corresponding to an engine-side request and obtain highly flexible engine-characteristics.

Moreover, in the case of an engine for performing very rarefied combustion such as a cylinder-injection-of-fuel engine which is recently noticed as an art capable of meeting the needs such as reduction of fuel consumption, reduction of exhaust gas, and improvement of engine output which are apparently reciprocal, it is necessary to precisely control the intake air quantity of an engine in order to decrease the fluctuation of engine output torque when normal combustion and rarefied combustion are changed under a driving state in which the opening degree of an accelerator is constant, that is, under a state in which the torque requested for the engine by a driver is constant. In the case of the cylinder-injection-of-fuel engine, because the rarefactive degree of fuel is high compared to that of a conventional rarefied-combustion engine, the control range of the intake air quantity is wide and therefor, it is necessary to further precisely control the intake air quantity.

As a unit for controlling the intake air quantity of an engine, there is a unit for controlling the idling speed of the engine by closing a throttle valve under the idling state of the engine and controlling the air quantity of an air duct bypassing the throttle valve in an intake pipe with an air control valve. Moreover, as units for controlling the output of an engine by controlling a throttle valve only for a specific driving state, there are a cruise-control unit for feedback-controlling a vehicle to a vehicle speed set by the driver and a traction control unit for reducing the output of an engine when a tire slips on a slippery road surface at the start of the vehicle.

The above-mentioned electronic-control throttle system simultaneously controls these engine outputs and thus, realizes simplification of the system structure of the entire engine and advanced control.

When a vehicle is moved backward by the back gear, a driver frequently assumes an unnatural driving posture compared to the case of forward running because the progress direction of the vehicle is backward. Therefore, the accelerator manipulability tends to deteriorate. Particularly, in the case of garaging or backward driving due to vehicle direction change, delicate accelerator manipulation at a relatively low speed is frequently necessary. Therefore, it is necessary to improve the accelerator manipulability for backward driving. Moreover, because accelerator manipulation is delicate under backward driving, if a vehicle speed is unexpectedly increased because a driver slightly extremely steps on an accelerator, the accelerator is resultantly excessively stepped on due to the backward acceleration of the vehicle because of the positional relation between the vehicle and the driver's leg even if the driver does not operate the accelerator. Thus, the vehicle speed may be further increased. Moreover, under backward driving, the driver frequently turns backward and thereby brake manipulation may be delayed. Therefore, if these states occur at the same time, the vehicle may contact a rear object in the worst case under backward driving which is frequently performed in a narrow place.

SUMMARY OF THE INVENTION

The present invention is made to solve the above problems and its object is to provide an engine-output control unit provided with an electronic-control throttle system capable of controlling the output rise or output fluctuation of an engine when performing backward driving with the back gear and realizing stable driving.

The engine-output control unit of embodiment 1 of the present invention controls the opening degree of a throttle valve for adjusting the air quantity to be taken into an engine when the transmission is set to the back gear to control the output of the engine.

The engine-output control unit of embodiment 2 of the present invention controls the opening degree of a throttle valve so as to set the maximum value of the opening degree of the throttle valve to a value smaller than the preset maximum opening degree of the throttle valve.

The engine-output control unit of embodiment 3 of the present invention controls the opening degree of a throttle valve so as to limit the operating speed of the throttle valve to the opening side.

The engine-output control unit of embodiment 4 of the present invention controls the opening degree of a throttle valve so as to compute the opening degree of the throttle valve by fixing an engine speed for computing the opening degree of the throttle valve to an idling-control target-engine-speed under idling independently of an accelerator control input.

The engine-output control unit of embodiment 5 of the present invention controls the opening degree of a throttle valve so as to compute the opening degree of the throttle valve by forcibly stopping the operation of a previously-designated load among loads when they are connected.

BRIEF DESCRIPTION OF THE INVENTION

FIGS. 6(a) to 6(h) are illustrations showing the relation between accelerator control input, throttle-valve opening degree, and engine speed of embodiments 2 and 3;

DETAILED DESCRIPTION OF THE PREFERRED EMBODIMENTS

Embodiments of the present invention are described below by referring to the accompanying drawings.

Embodiment 1

Figure 1:
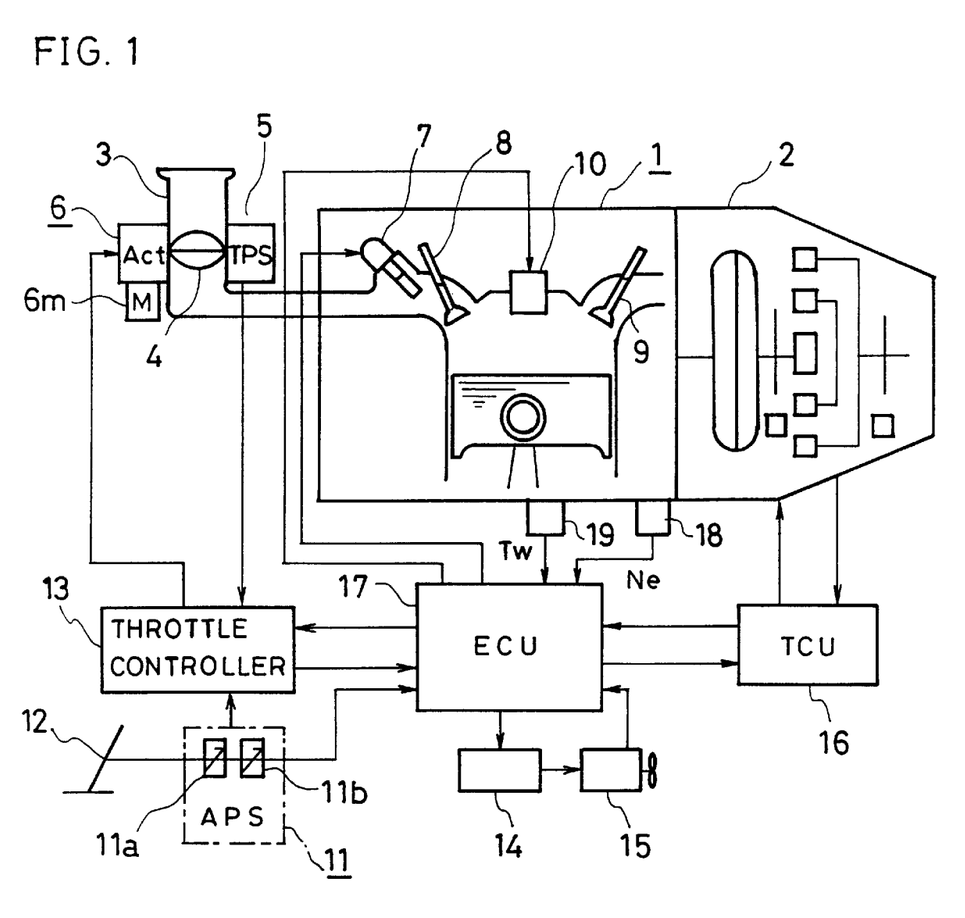
FIG. 1 is a general block diagram of an engine control system of the present invention.

FIG. 1 is a general block diagram showing an embodiment of an engine control system provided with an engine-output control unit of the present invention, in which reference numeral 1 denotes a normal vehicle engine, 2 denotes a transmission connected to the not-illustrated output shaft of the engine 1, 3 denotes an intake pipe of the engine, 4 denotes a throttle valve set to the intake pipe 3 to adjust the air quantity to be taken into the engine 1, 5 denotes a throttle-opening-degree sensor (TPS) for detecting the position of the throttle valve 4, 6 denotes a throttle actuator provided with a motor 6m to operate the throttle valve 4, 7 denotes an injector for supplying fuel to the engine 1, 8 denotes an intake valve of the engine 1, 9 denotes an exhaust valve of the engine 1, 10 denotes a spark plug for burning the fuel supplied to the engine 1, and 11 denotes an accelerator-opening-degree sensor (APS) for detecting the control input of an accelerator pedal 12 to be operated by a driver. Accelerator-opening-degree information is a signal important to determine an engine output. Therefore, in the case of this embodiment, the accelerator-opening-degree sensor (APS) 11 is constituted with a double system comprising two accelerator-opening-degree sensors 11a and 11b.

Moreover, reference numeral 13 denotes a throttle controller for supplying a command signal to the throttle actuator 6, 14 denotes an air-conditioner operating unit for controlling an air conditioner 15, 16 denotes a transmission control unit (TCU) for controlling speed change steps of the transmission 2, and 17 denotes an engine-output control unit (ECU) provided with an electronic-control throttle system for recognizing the engine output requested by a driver in accordance with the output value of the accelerator-opening-degree sensor (APS) 11 and controlling the throttle valve 4 through the throttle controller 13 to control the air quantity to be taken into the engine 1 by the electronic-control throttle system. The engine-output control unit (ECU) 17 controls the output of the engine 1 to the requested engine output in accordance with the engine speed Ne input from engine-speed detection means 18 and engine-cooling-water temperature Tw input from a water-temperature sensor 19 which are provided for the engine 1, the fuel quantity to be supplied to the engine 1, ignition timing, and operation state of the air conditioner 15. Moreover, when the gear sate is set to the back gear, the ECU 17 controls the opening degree of the throttle valve 4 so as to reduce the output of the engine 1. Furthermore, the TCU 16 and ECU 17 communicate information each other, that is, transfer the information for the connection state (shift step) of the transmission 2 with the engine 1 each other.

Figure 2A:
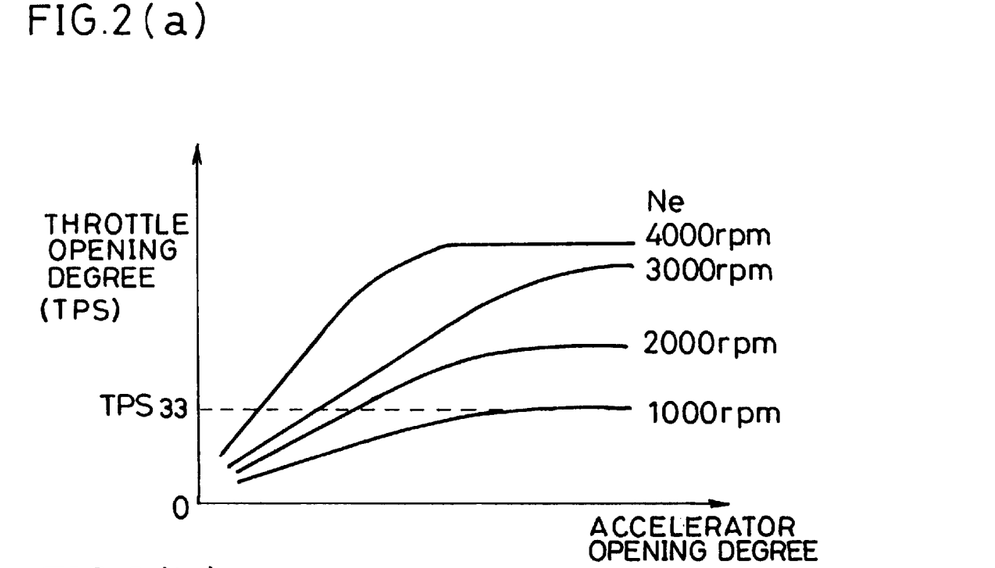
FIGS. 2(a) and 2(b) are characteristic diagrams of an electronic-control throttle and a mechanical-control throttle.
Figure 2B:
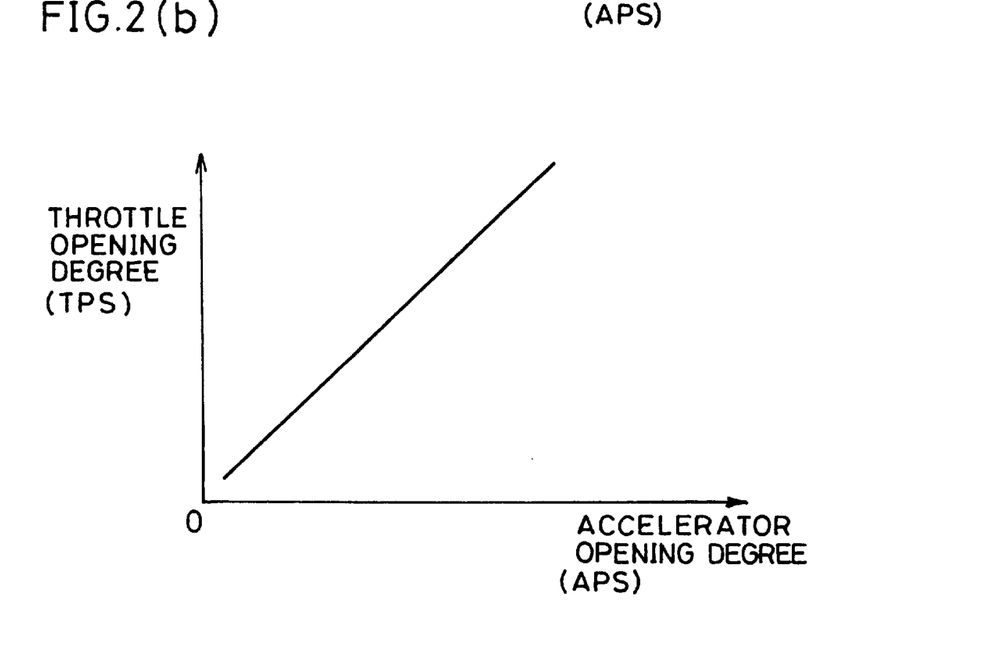

FIG. 2(a) is an illustration showing the relation between output value of the accelerator-opening-degree sensor (APS) 11 which is the characteristic of the electronic-control throttle set in the engine-output control unit (ECU) 17 and output value of the throttle-opening-degree sensor (TPS) 5 and FIG. 2(b) is an illustration showing the characteristic of a conventional mechanical-control throttle. In the case of a conventional mechanical-control throttle, the accelerator pedal 12 and throttle valve 4 to be operated by a driver are mechanically connected with an accelerator wire, the throttle valve 4 is operated synchronously with an accelerator control input (control input of the accelerator pedal 12) by the driver, and the opening degree of the throttle valve 14 is almost proportional to the accelerator control input by the driver.

In the case of an electronic-control throttle, however, an accelerator control input by a driver is detected as the output value of the accelerator-opening-degree sensor (APS) 11 (APS output value) and the APS output value is input to the ECU 17 as torque information requested to the engine 1 by the driver. The ECU 17 operates the throttle valve 4 through the throttle controller 13 so as to control the opening degree of the throttle valve 4 in accordance with the operation state of the engine 1 such as the torque information requested to the engine 1 or the above engine speed Ne. The opening degree of the throttle valve 4 is returned to the ECU 17 through the throttle controller 13 as the output value of the throttle-opening-degree sensor (TPS) 5 (TPS output value). Moreover, the TPS output value increases as the APS output value increases. Even in the case of the same APS output value, however, the opening degree of the throttle valve 4 is controlled in accordance with the engine speed Ne so as to quickly open the throttle valve 4 when the engine 1 rotates at a high speed and slowly open the throttle valve 4 when the engine 1 rotates at a low speed as shown in FIG. 2(a). Therefore, in the case of the electronic-control throttle, it is possible to control an engine in accordance with the torque requested by a driver.

Then, the method of the embodiment 1 for controlling the opening degree of the throttle valve 4 is described below by referring to the flow chart in FIG. 3. The flow chart shows a control flow of an electronic-control throttle that is a part of the control flow (control program) of the engine 1 incorporated into the engine-output control unit (ECU) 17.

When the control program starts (START), the ECU 17 completes such engine control processings as fuel-supplyquantity control and ignition-timing control (step S1) and then, reads input information concerned with an electronic-control throttle (step S2). The input information includes, for example, gear information (neutral, first gear, second gear, or back gear) sent from the TCU 16 through communication, air-conditioner-15-operation request signal (A/C information) sent from the air-conditioner operating unit 14, engine speed Ne sent from the engine-speed detection means 18, and APS output value sent from the accelerator-opening-degree sensor (APS) 11. When read of the input information is completed, the ECU 17 computes a target throttle opening degree (TPSN) corresponding to a preset APS output value and engine speed Ne in accordance with the map data of the target throttle opening degree using the preset APS output value and the engine speed Ne as parameters in order to adjust the air quantity to be taken into the engine 1 for obtaining the engine output requested by the present driver (step S3).

Then, the ECU 17 decides whether the present gear state is set to the back gear (backward running of vehicle) in accordance with the gear information read in the above step S2 (step S4). When the present gear state is set to the back gear, the ECU 17 performs the correction for obtaining a target-throttle-opening-degree correction value (TPSZ) which is a value obtained by multiplying the target throttle opening degree (TPSN) computed in step S3 by a predetermined coefficient K (K<1) corresponding to the preset engine speed Ne (step S5) and moreover, computes a motor control input of the motor 6m corresponding to the deviation ΔTPS between the corrected target throttle opening degree (TPSZ) and the TPS output value and controls the operation of the throttle valve 4 so as to adjusts the throttle opening degree to the target-throttle-opening-degree correction value (TPSZ) (step S6). Moreover, when the present gear state is not set to the back gear in step S4, step S6 is started to compute the motor control input of the motor 6m corresponding to the deviation ΔTPS between the target throttle opening degree (TPSN) computed in step S3 and the TPS output value and control the operation of the throttle valve 4 so that the throttle opening degree becomes equal to the target throttle opening degree (TPSN).

Figure 4A:
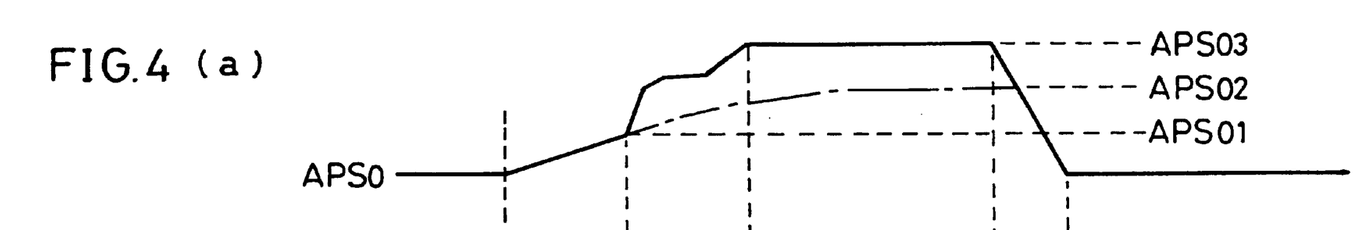
FIGS. 4(a) to 4(c) are illustrations showing the relation between accelerator control input, throttle-valve opening degree, and vehicle speed of the embodiment 1.
Figure 4B:
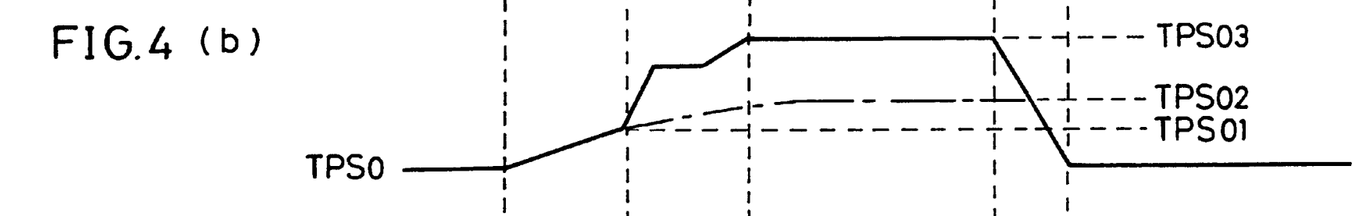
Figure 4C:
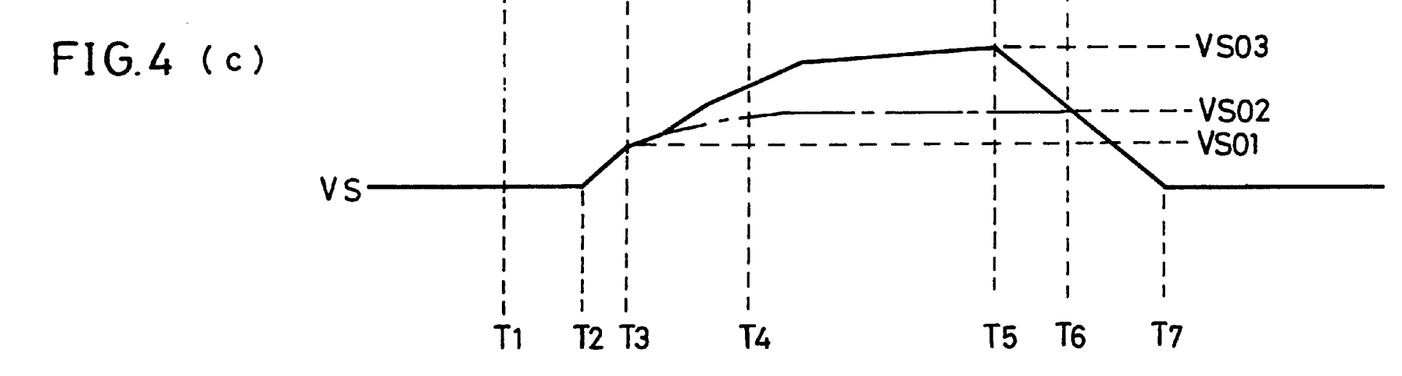

FIGS. 4(*a*), 4(*b*), and 4(*c*) are illustrations showing the relation between accelerator control input, throttle opening degree, and vehicle speed behavior when a vehicle is driven backward. In FIGS. 4(*a*) to 4(*c*), a broken line shows the behavior of the expected value of a driver, a continuous line shows the behavior of a conventional control unit having a mechanical-control throttle, and an alternate long and short dash line shows the behavior of an engine-output control unit having an electronic-control throttle of the present invention. Moreover, in FIGS. 4(*a*) to 4(*c*), the APS output value corresponding to the accelerator control input by a driver is shown as $APS_0$, the TPS output value corresponding to the opening degree of the throttle valve 4 is shown as $TPS_0$, and the speed of a vehicle is shown as Vs. The vehicle speed Vs is input to the ECU 17 from a vehicle-speed sensor (not illustrated) set to the driving shaft of a not-illustrated wheel connected to the rear stage of the transmission 2.

As shown in FIG. 4(*a*), a driver keeps the $TPS_0$ at $TPS_{01}$ as shown in FIG. 4(*b*) and expects to perform backward driving by controlling the vehicle speed Vs to $Vs_{01}$ as shown in FIG. 4(*c*) by slowly stepping on the accelerator pedal 12 starting with the time $T_1$ and operating an accelerator so that the $APS_0$ stops at $APS_{01}$ at the time $T_3$ as shown in FIG. 4(*a*).

However, because the vehicle starts moving at the time $T_2$ ($T_1<T_2<T_3$), the driver may relatively excessively step on the accelerator pedal 12 due to the backward acceleration. In this case, for a conventional control unit, because the opening degree of the throttle valve 4 is proportional to an accelerator control input, the throttle valve 4 opens to the opening side by a value equivalent to the value of excessively stepping on the pedal 12 and thus, the engine output increases. Therefore, because the vehicle speed Vs is further increased at the time $T_3$, excessively stepping on the pedal 12 by the driver is repeated. The excessive-stepping value is gradually decreased by repeating the operation. When the $APS_0$ reaches $APS_{03}$ (time $T_4$), the $APS_0$ becomes an almost constant value. In this case, the $TPS_0$ is increased due to the change of the $APS_0$, the throttle valve 4 opens to the opening side until the $TPS_0$ becomes the $TPS_{03}$. Therefore, resultantly, the vehicle speed Vs increases up to $Vs_{03}$.

However, the embodiment 1 controls the opening degree of the throttle valve 4 as shown in FIG. 4(*b*) when the gear state is set to the back gear, that is, controls a target throttle opening degree by multiplying the computed target throttle opening degree (TPSN) by a predetermined coefficient K (K<1) corresponding to the preset engine speed Ne and controls the opening degree of the throttle valve 4 in accordance with the above controlled target throttle opening degree. Therefore, even if the accelerator pedal 12 is excessively stepped on when a vehicle starts, it is possible to control the vehicle speed and moreover, excessive accelerator-stepping is not almost repeated because the excessive-stepping value is small. Therefore, because it is possible to keep the $TPS_0$ at a value smaller than the $TPS_{03}$, it is possible to control the vehicle speed $Vs_{02}$ to a value smaller than the $Vs_{03}$ and control the sudden change of a vehicle while the vehicle is driven backward.

Embodiment 2

Figure 3:
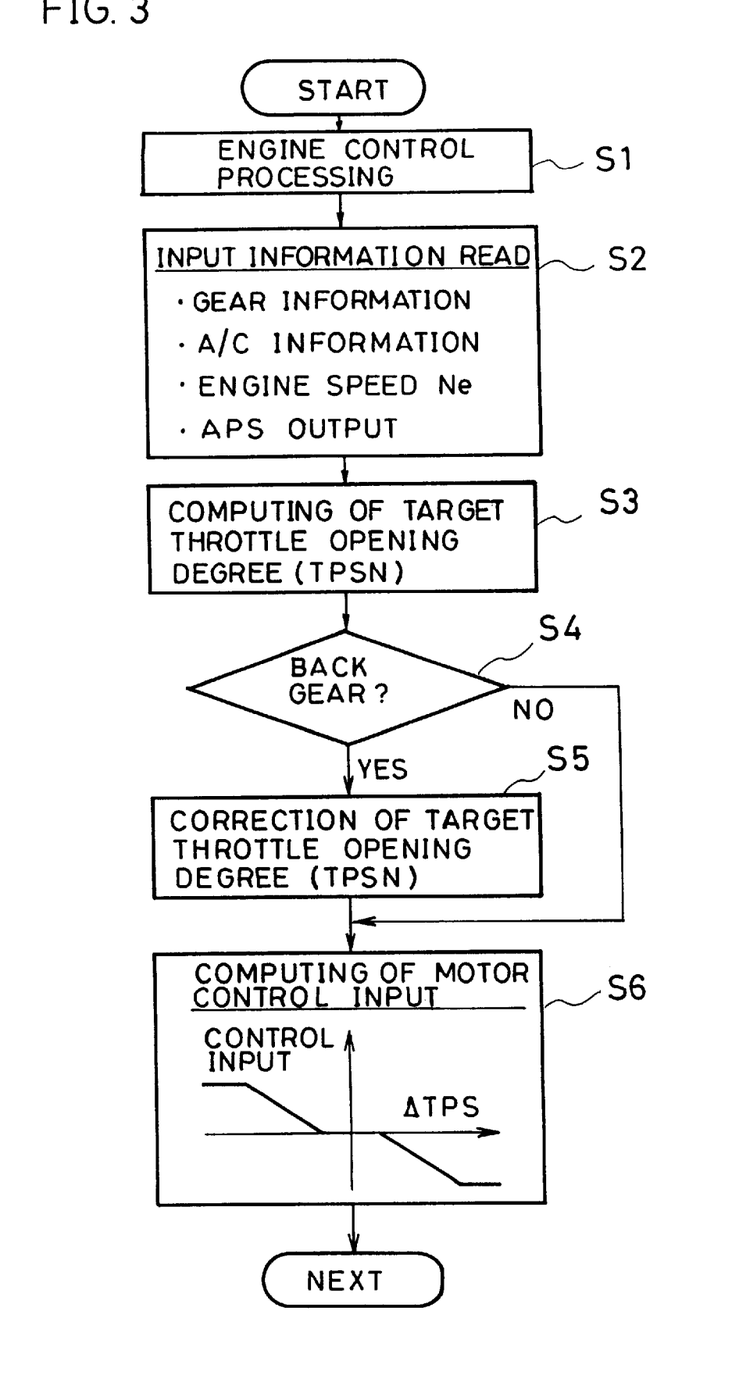
FIG. 3 is an illustration showing the throttle control flow of embodiment 1 of the present invention.

In the case of the embodiment 1, when the gear state is set to the back gear, correction is performed so as to control the target throttle opening degree (TPSN) by multiplying the target throttle opening degree by a predetermined coefficient K (K<1) corresponding to the engine speed Ne as shown by the control flow in FIG. 3. In the case of the correction of the target throttle opening degree shown in step S5 of the above control flow it is possible to further accurately control the opening degree of the throttle valve 4 by limiting the maximum value of the throttle opening degree at the opening side and further securely control the rise of vehicle speed under backward driving.

Figure 5:
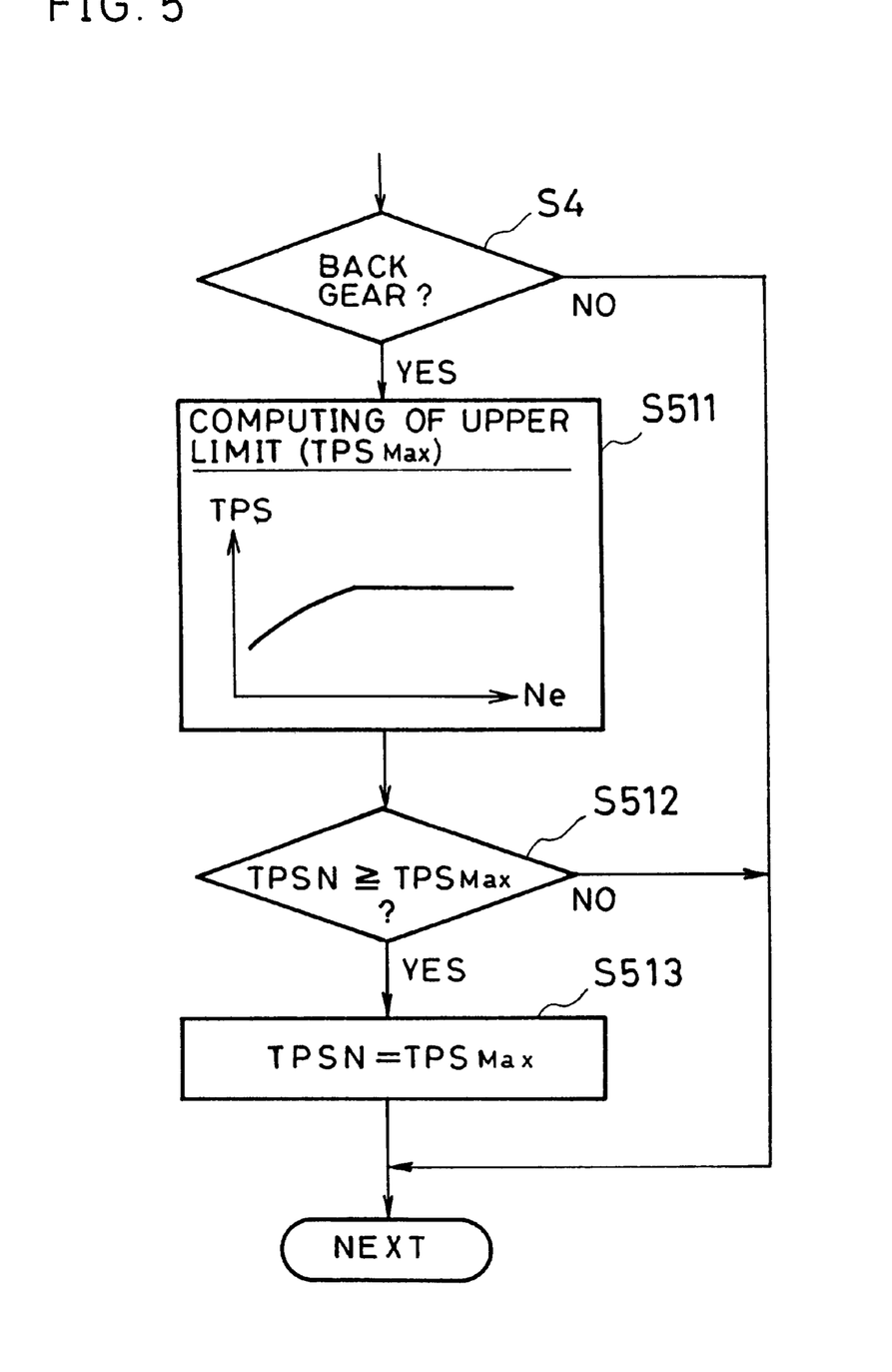
FIG. 5 is an illustration showing the throttle control flow of the embodiment 2.

FIG. 5 shows a flow chart for controlling the opening degree of the throttle valve 4, in which, when the present gear state is set to the back gear, an upper-limit throttle opening degree $TPS_{Max}$ serving as the upper limit of a target throttle opening degree corresponding to a preset engine speed Ne is obtained in accordance with the relation between the engine speed Ne and the upper-limit throttle opening degree ($TPS_{Max}$) (step S511) to compare the $TPS_{Max}$ with the target throttle opening degree TPSN (step S512). When the above TPSN is equal to or more than the $TPS_{Max}$, the TPSN is replaced with the $TPS_{Max}$ in order to control the opening degree of the throttle valve 4 (step S513) and thereafter, the next step (step S6 in FIG. 3) is started to control the operation of the throttle valve 4 in accordance with the replaced TPSN. When the TPSN is less than the $TPS_{Max}$ in the above step S512, it is unnecessary to control the throttle opening degree because the throttle opening degree is small. Therefore, in this case, the operation of the throttle valve 4 is controlled in accordance with the TPSN obtained in step S3 in FIG. 3.

Figure 6A:
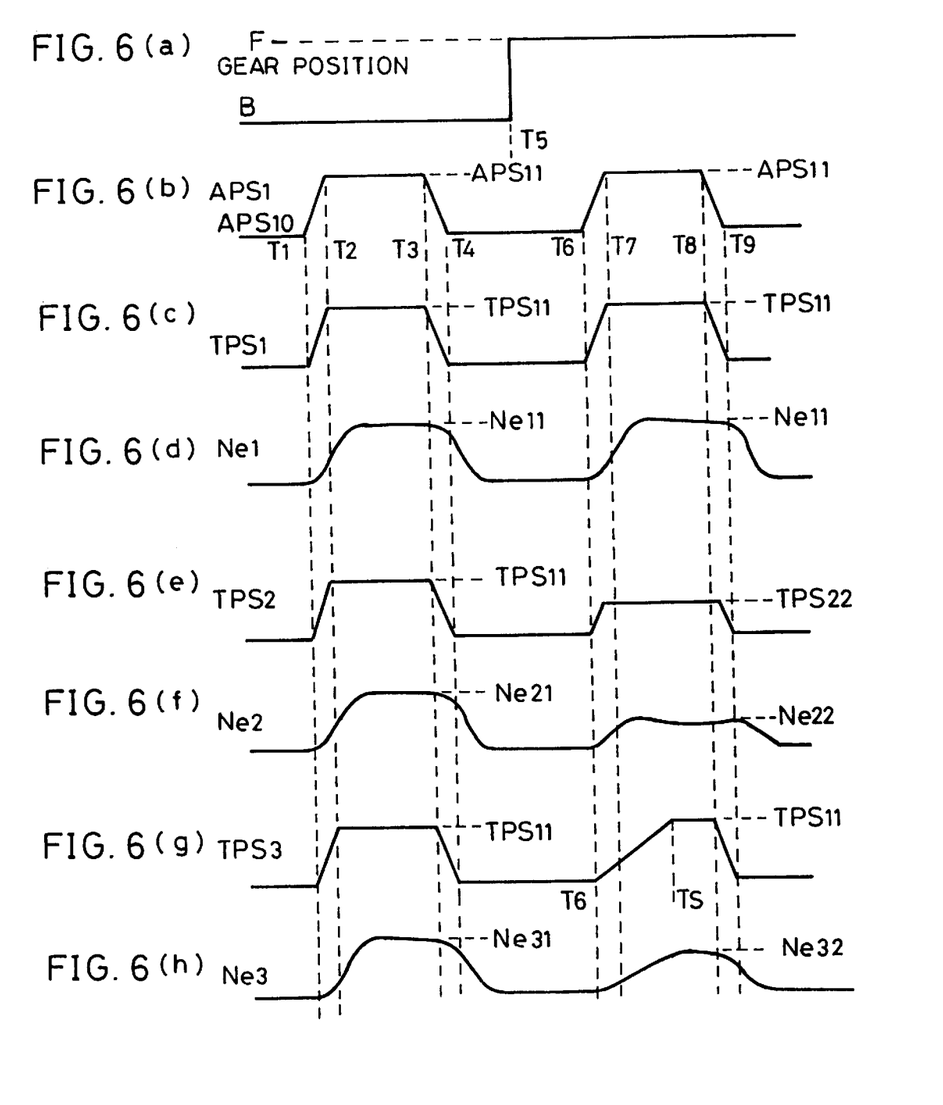

Then, the operation of this embodiment 2 when controlling the opening degree of a throttle is described below by referring to FIGS. 6(a) to 6(f). In FIGS. 6(a) to 6(f), FIG. 6(a) shows the gear state of a vehicle, FIG. 6(b) shows $APS_1$ which is an APS output value corresponding to the accelerator control input by a driver, FIGS. 6(c) and 6(d) show $TPS_1$ which is a conventional TPS output value and an engine speed $Ne_1$, and FIGS. 6(e) and 6(f) show $TPS_2$ which is the TPS output value of this embodiment 2 and the temporal change of engine speed $Ne_2$.

It is initially assumed that the gear state of a vehicle is set to the forward state and the APS output value $APS_1$ is set to $APS_{10}$. A driver steps on the accelerator pedal 12 until the $APS_1$ becomes an $APS_{11}$ state between the time $T_1$ and the time $T_2$ and after a certain time passes, returns the accelerator pedal 12 to the $APS_{10}$ state again between the time $T_3$ and $T_4$. Thereafter, it is assumed that the driver sets the gear state of the vehicle to the back gear to bring the vehicle into the backward moving state at the time $T_5$, steps on the accelerator 12 up to the $APS_{11}$ state between the time $T_6$ and the time $T_7$, and after a certain time passes, returns the accelerator to the $APS_{10}$ state again between the time $T_8$ and the time $T_9$.

In this case, for the conventional control unit, the throttle opening degree $TPS_1$ performs the same operation as the $APS_1$ because the $TPS_1$ operates synchronously with the $APS_1$ {FIG. 3(b)}, the $TPS_1$ rises up to the $TPS_{11}$ when the $APS_1$ is set to the $APS_1$, state, and the engine speed $Ne_1$ increases up to $Ne_{11}$. The $TPS_2$ of this embodiment 2 rises up to the $TPS_{21}$ similarly to the case of the conventional control unit and thereby, the engine speed $Ne_2$ increases up to $Ne_{21}$ under forward-state driving up to the time $T_5$ and thereby, the engine speed $Ne_2$ up to $Ne_{21}$.

In the case of the conventional control unit, however, under backward-state driving since the time $T_5$, the $TPS_1$ rises up to the $TPS_{11}$ when the opening degree of the accelerator increases to the $APS_{11}$ similarly to the case of the above forward-state driving and thereby, the engine speed $Ne_1$ increases up to $Ne_{11}$. In the case of the embodiment 2, the upper limit of the TPS1 is limited to the upper-limit throttle opening degree ($TPS_{Max}$) due to the engine speed Ne. Therefore, when assuming the $TPS_{Max}$ as $TPS_{22}$, the throttle opening degree $TPS_2$ does not exceed the $TPS_{22}$. Therefore, the engine speed $Ne_2$ is controlled to $Ne_{22}$ that is an engine speed lower than the $Ne_{11}$. Thereby, it is possible to control rise of the vehicle speed under backward driving and realize stable driving even when performing backward driving with the back gear.

Embodiment 3

In the case of the embodiment 2, rise of the vehicle speed under backward driving is controlled by limiting the maximum value of throttle opening degree at the opening side. However, it is also possible to control rise of the vehicle speed under backward driving by controlling the opening degree of the throttle valve 4 so as to limit the operation speed of the throttle valve 4 to the opening side.

Figure 7:
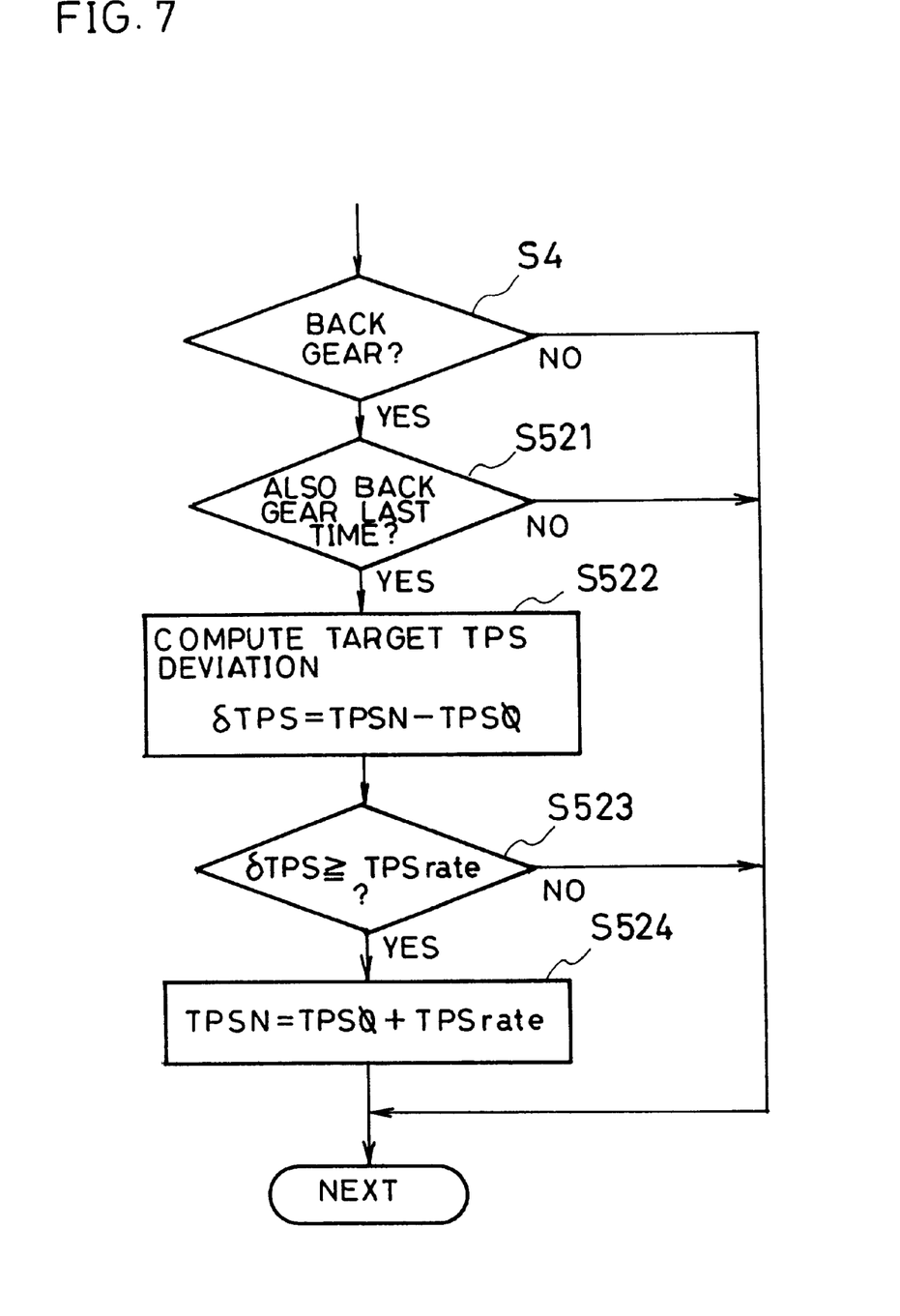
FIG. 7 is an illustration showing the throttle control flow of the embodiment 3.

That is, as shown by the control flow in FIG. 7, when the present gear state is set to the back gear, it is first decided whether the gear state was set to the back gear in the last step S4 (step S521) and when it is decided that the gear state is set the back gear last time and this time, the deviation (δ TPSN) between the target throttle opening degree (TPSO) computed under the last-time backward driving and the target throttle opening degree (TPSN) is computed (step S522) to compare the deviation (δ TPSN) with a preset reference deviation ($TPS_{rate}$) (step S523). When the δ TPSN is equal to or more than the $TPS_{rate}$, step S524 is started to replace the target throttle opening degree (TPSN) with the sum of the above TPSO and $TPS_{rate}$ (TPSN=TPSO+$TPS_{rate}$) and control the operation of the throttle valve 4 in accordance with the replaced TPSN in the next step (step S6 in FIG. 3). In the above step S523, when the δ TPSN is less than the $TPS_{rate}$, it is unnecessary to control the throttle operation speed because the throttle operation speed is slow. Therefore, the operation of the throttle valve 4 is controlled in accordance with the TPSN obtained in step S3 in FIG. 3. Moreover, when it is decided that the gear state is set to the back gear for the first time in the above step S521, the operation of the throttle valve 4 is controlled in accordance with the TPSN obtained this time.

Then, operations of the embodiment 3 when controlling a throttle opening degree is described below by referring to FIGS. 6(a) to 6(d) and FIGS. 6(g) and 6(h). However, because FIGS. 6(a) to 6(d) are the same as the case of the embodiment 2, their description is omitted.

FIGS. 6(g) and 6(h) are illustrations showing temporal changes of the TPS output value $TPS_3$ and the engine speed $Ne_3$, in which the throttle opening degree $TPS_3$ rises up to the $TPS_{11}$ similarly to the case of the conventional control unit and thereby, the engine speed $Ne_3$ increases up to $Ne_{31}$ under forward-state driving up to the time $T_5$ and thereby, the engine speed $Ne_3$ up to $Ne_{31}$. Under backward-state driving since the time $T_5$, because the operation speed of the throttle valve 4 to the opening side is limited as described above, the $TPS_3$ slowly rises even if a driver steps on the accelerator up to the $APS_{11}$ state between the time $T_6$ and the time $T_7$. Therefore, the time $T_s$ when the $TPS_2$ reaches the $TPS_{11}$ is delayed from the time $T_7$ and thereby, rise of the engine speed $Ne_3$ is controlled. Moreover, though the time $T_s$ is set so as to meet $T_6 < T_s < T_7$ in FIGS. 6(g) and 6(h), the $TPS_3$ may not reach the $TPS_{11}$ depending on the interval between the time $T_6$ and the time $T_7$. Anyhow, in the case of the embodiment 3, the engine speed $Ne_{32}$ is controlled so as to be lower than the $Ne_{31}$ as shown in FIG. 6(h) as shown in FIG. 6(h). Therefore, it is possible to realize stable driving even when performing backward driving with the back gear.

Embodiment 4

In the case of the embodiments 2 and 3, rise of the vehicle speed under backward driving is controlled by limiting the opening degree of the throttle valve 4 under the back-gear state. However, as shown by the control flow in FIG. 8, it is possible to control rise of engine speed by fixing the engine speed Ne for computing the target throttle opening degree (TPSN) to an idling-control target engine speed under idling and controlling the opening degree of the throttle valve 4 so as to compute the opening degree of the throttle valve 4.

Figure 8:
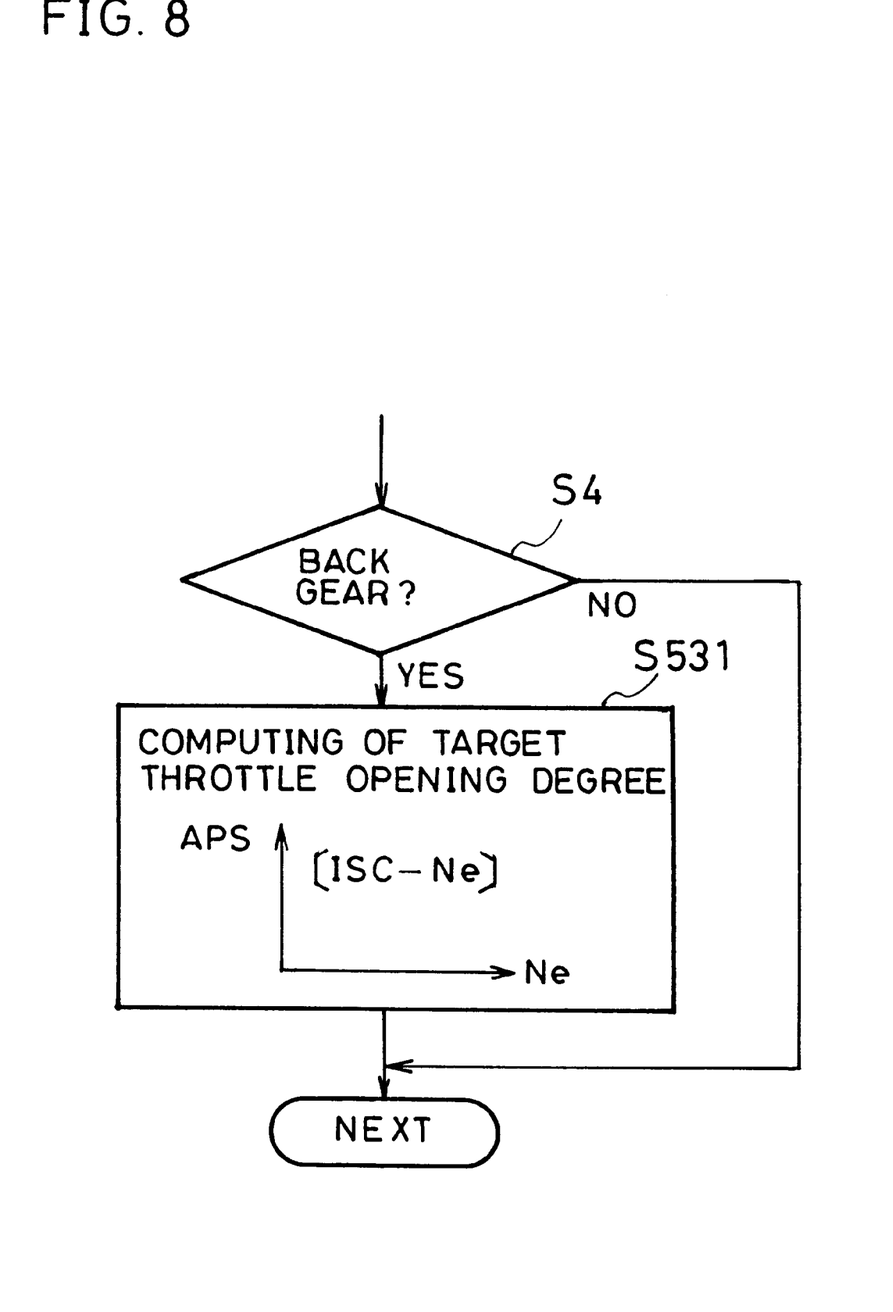
FIG. 8 is an illustration showing the throttle control flow of embodiment 4.

That is, when the present gear state is set to the back gear, an APS output value is obtained as the map data for obtaining a target throttle opening degree by using the map data for throttle opening degree using an idling-control target engine speed (ISC-Ne) under idling and the APS output value as parameters to control the operation of the throttle valve 4 by using the APS output value as the target throttle opening degree (TPSN).

Figure 9A:
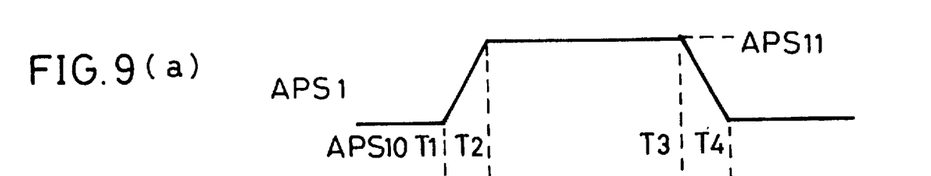
FIGS. 9(a) to 9(g) are illustrations showing the relation between accelerator control input, throttle-valve opening degree, and engine speed of the embodiment 4.
Figure 9B:
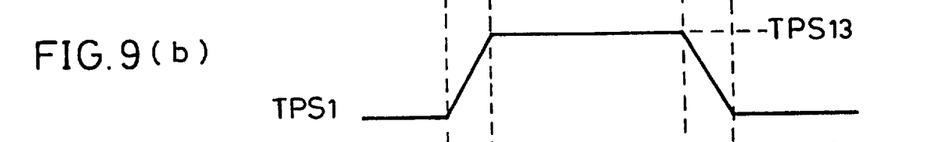
Figure 9C:
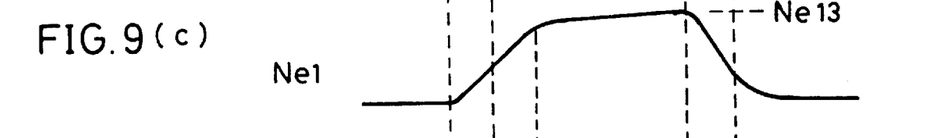
Figure 9D:
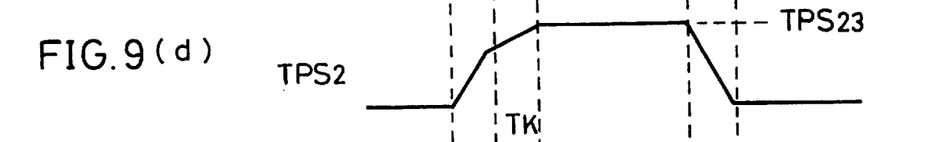
Figure 9E:
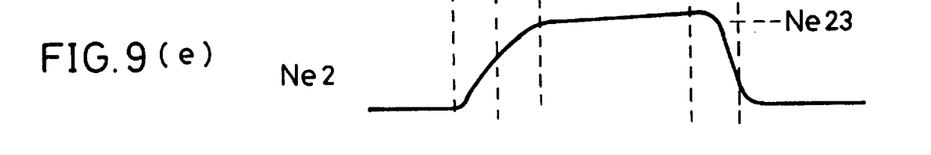
Figure 9F:
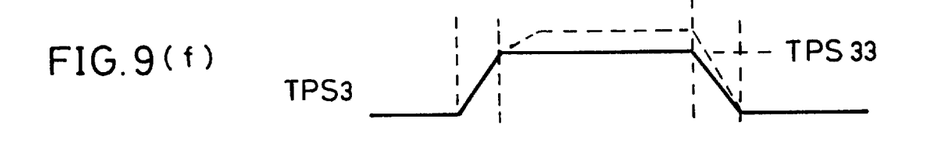
Figure 9G:
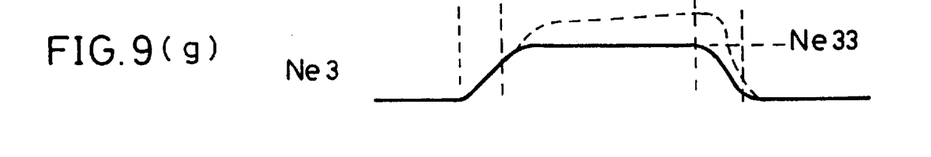

FIGS. 9(a) to 9(g) are illustrations showing the timing chart for throttle control under the back gear state of the embodiment 4, in which FIG. 9(a) shows the APS output $APS_1$ corresponding to the accelerator control input by a driver, FIGS. 9(b) and 9(c) show the TPS output value $TPS_1$ and the engine speed $Ne_1$ of a conventional control unit, FIGS. 9(d) and 9(e) show the TPS output value $TPS_2$ and the engine speed $Ne_2$ of a system corresponding to a conventional electronic-control throttle, and FIGS. 9(f) and 9(g) show the TPS output value $TPS_1$ and the engine speed $Ne_3$ of the embodiment 4.

It is initially assumed that the gear state of a vehicle is set to the backward state and the accelerator opening degree state is set to the $APS_{10}$ state. Moreover, it is assumed that a driver steps on the accelerator pedal 12 up to the $APS_{11}$ state between the time $T_1$ and the time $T_2$ and after a certain time passes, returns the accelerator to the $APS_{10}$ state again between the time $T_3$ and the time $T_4$.

In this case, for a conventional control unit, because the $TPS_1$ operates synchronously with the $APS_1$, the $TPS_1$ rises up to the $TPS_{13}$ when the $APS_1$ is set to the $APS_{11}$ state and thereby, the engine speed $Ne_1$ increases up to $Ne_{13}$. Moreover, for a conventional electronic-control throttle, the $TPS_2$ rises in accordance with the engine speed $Ne_2$ differently from the $TPS_1$. However, the $TPS_2$ increases up to the time $T_K$ ($T_2<T_K<T_3$) when the $TPS_1$ rises up to $Ne_{23}$ and thereafter, changes so as to become an almost constant value. For the embodiment 4, however, the engine speed for computing a target throttle opening degree is fixed to an idling-control target engine speed under idling such as 1,000 rpm. Therefore, as shown in FIG. 9(f), the $TPS_3$ is clipped to an almost constant value $TPS_{33}$ independently of rise of the $APS_1$. Therefore, the engine speed $Ne_3$ is controlled to the $Ne_{33}$ that is an engine speed lower than the $Ne_{13}$ or $Ne_{23}$, and thus, it is possible to control rise of a vehicle speed.

Embodiment 5

Figure 10:
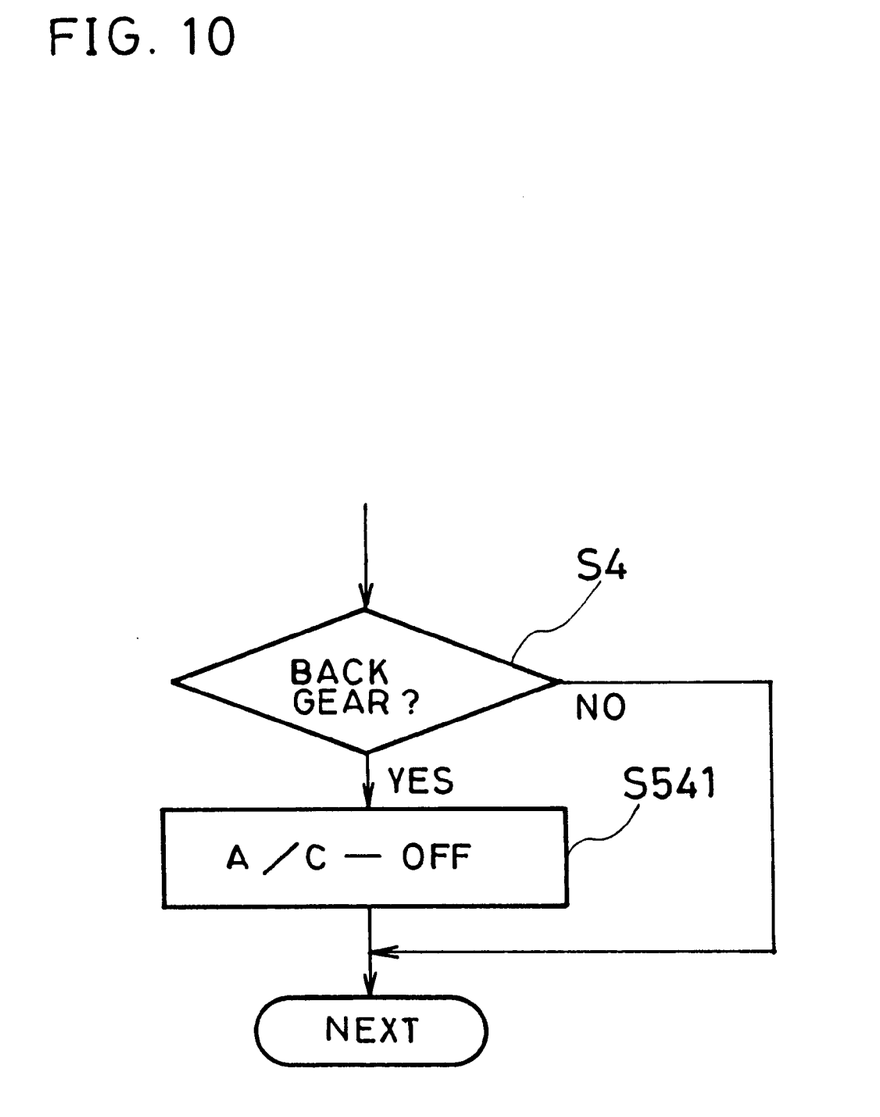
FIG. 10 is an illustration showing the throttle control flow of embodiment 5.

When a load of an air conditioner or the like is applied to the engine 1 and the load operates, the ECU 17 corrects the target throttle opening degree (TPSN) to the opening side in order to operate the load to try to increase an engine output. The above load includes not only a load directly related to the operation state of a vehicle such as a power steering wheel but also a load not related to the operation state of an air conditioner or the like. Moreover, because the load of an air conditioner is particularly large, the target throttle opening degree (TPSN) also greatly changes when the air conditioner is turned on and off. Therefore, when the present gear state is set to the back gear, it is possible to control the fluctuation of vehicle speed by turning off an air conditioner (A/C) 15 independent of the operation state of a vehicle and having a large load and controlling the fluctuation of the engine speed under backward driving as shown by the control flow in FIG. 10.

Figure 11A:
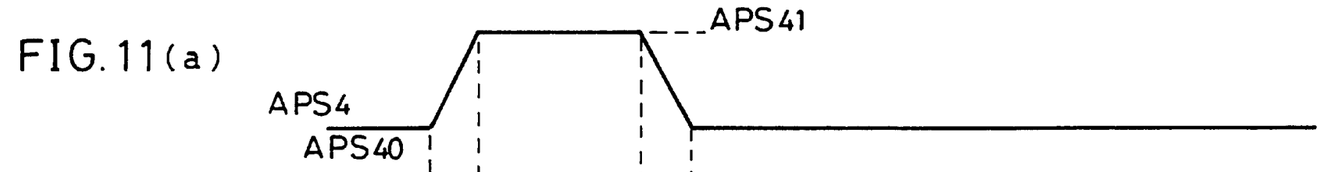
FIGS. 11(a) to 11(d) are illustrations showing the relation between accelerator control input, throttle-valve opening degree, and engine speed of embodiment 5.
Figure 11B:
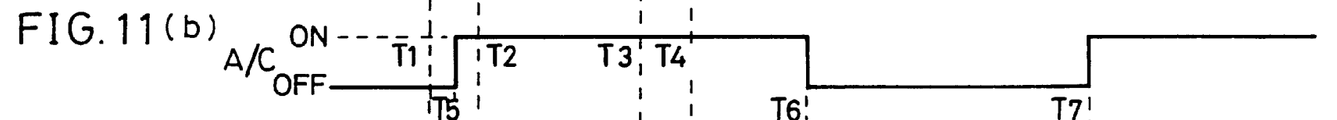
Figure 11C:
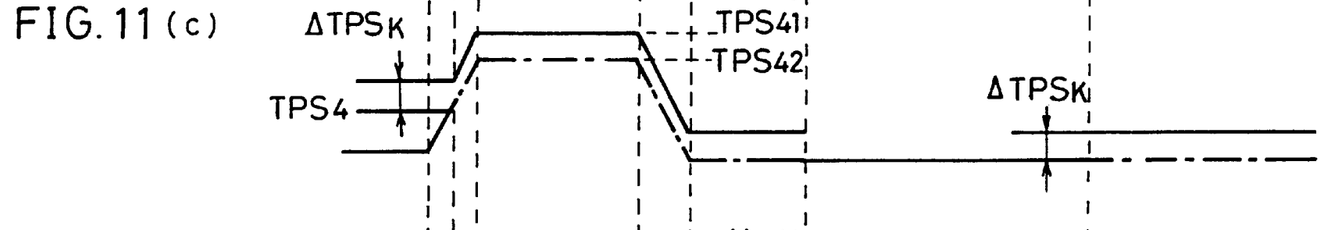
Figure 11D:
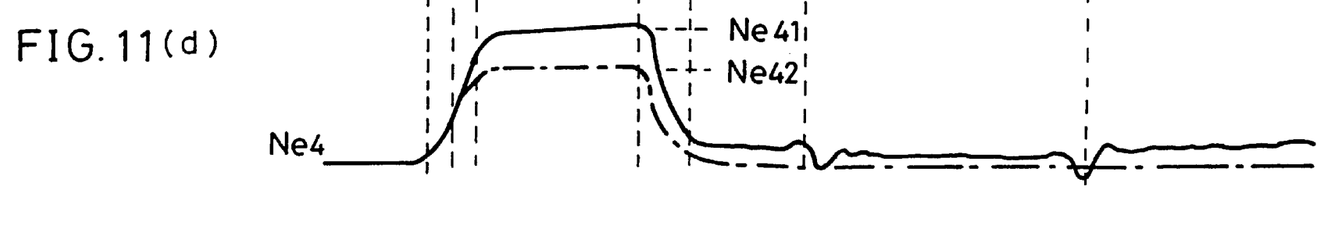

FIGS. 11(a) to 11(d) are illustrations showing a time chart for throttle control under the back gear state when an air conditioner is connected to a vehicle, in which FIG. 11(a) shows an APS output $APS_4$ corresponding to the accelerator control input by a driver, FIG. 11(b) shows the operating state of an air conditioner (A/C), and FIG. 11(c) shows a TPS output value $TPS_4$ of an electronic-control throttle in which a continuous line shows the TPS output value of a conventional control unit and a broken line shows the TPS output value of the embodiment 4. Moreover, FIG. 11(d) shows an engine speed $Ne_4$, in which a continuous line shows the engine speed of a conventional control unit and a broken line shows that of the embodiment 5.

The TPS output value $TPS_4$ of a conventional control unit increases as the $APS_4$ at the time T1 increases as shown in FIG. 11(c). However, to absorb the decrease of the engine speed $Ne_4$ due to operation of the air conditioner 15 at the time $T_5$ ($T_5>T_1$), the engine speed $Ne_4$ is increased up to $Ne_{41}$ by using the $TPS_4$ as a value $TPS_{41}$ obtained by correcting the $TPS_4$ by $\Delta TPS_k$ to the opening side.

Moreover, even if the $APS_4$ does not increase, when the air conditioner 15 operates at the time $T_7$, the throttle opening degree is corrected again by the $\Delta TPS_k$ to the opening side in order to absorb decrease of the engine speed due to the air conditioner 15. Thus, in the case of a conventional control unit, because the $TPS_4$ changes by $\Delta TPS_k$ stepwise due to operation of the air conditioner 15, engine speed is fluctuated.

In the case of the embodiment 5, however, even if operating the air conditioner 15 is requested at the time T5 or T7, the ECU 17 controls the air conditioner 15 so as to be kept turned off. Therefore, load fluctuation of the air conditioner 15 does not occur in the engine 1. Thus, because it is unnecessary to correct the TPS4, the engine speed can be controlled to $Ne_{42}$ lower than the $Ne_{41}$ and vehicle speed fluctuation can be controlled.

Advantages of the Invention

As described above, according to the invention of embodiment 1, when the transmission is set to the back gear state, the opening degree of a throttle valve for adjusting the air quantity to be taken into the engine is controlled and thereby, the engine output is controlled. Therefore, it is possible to control rise of the engine output and output fluctuation of the engine under backward driving and perform stable backward driving.

The engine-output control unit of embodiment 2 of the present invention controls the opening degree of a throttle valve so as to set the maximum value of the opening degree of the throttle valve to a value smaller than a preset maximum opening degree of the throttle valve. Therefore, it is possible to control the engine speed under backward driving and realize stable driving.

The engine-output control unit of embodiment 3 of the present invention controls the opening degree of a throttle valve so as to limit the operation speed of a throttle valve to the opening side. Therefore, rise of the engine speed is controlled and it is possible to realize stable driving even when performing backward driving with the back gear.

The engine-output control unit of embodiment 4 of the present invention controls the opening degree of a throttle valve so as to compute the opening degree of the throttle valve by fixing the engine speed for computing the opening degree of the throttle valve to an idling-control target engine speed under idling independently of an accelerator control input. Therefore, the opening degree of the throttle valve can be clipped to an almost constant value independently of rise of the accelerator control input. Thus, it is possible to control the engine speed and rise of the vehicle speed.

The engine-output control unit of embodiment 5 of the present invention controls the opening degree of a throttle valve so as to compute the opening degree of the throttle valve by forcibly stopping the operation of a previously-designated load among loads when they are connected. Therefore, load fluctuation due to operation of an air conditioner does not occur. Thus, it is possible to control vehicle-speed fluctuation.

What is claimed is:

1. An engine-output control unit for computing the opening degree of a throttle valve for adjusting the air quantity to be taken into an engine in accordance with a target speed of said engine to control the output of said engine by controlling said throttle valve, wherein the opening degree of said throttle valve is controlled when the transmission is set to a reverse gear so as to control the output of said engine, wherein a maximum value of the opening degree of said throttle valve is controlled so as to set the maximum value of the opening degree of said throttle valve to a value smaller than a preset maximum opening degree of said throttle valve.

2. The engine-output control unit according to claim 1, wherein the opening degree of said throttle valve is controlled so as to control the operating speed of said throttle valve to an opening side.

3. The engine-output control unit according to claim 1, wherein said control unit computes the opening degree of said throttle valve by fixing an engine speed for computing the opening degree of said throttle valve independently of an accelerator control input to an idling-control target-engine-speed under idling.

4. The engine output control unit according to claim 1 wherein said control unit computes the opening degree of said throttle valve by forcibly stopping the operation of a previously-designated load among loads when said loads are connected.

5. An engine-output control unit according to claim 4 wherein said previously designated load is an air conditioning unit.

6. An engine-output control unit according to claim 4 wherein said previously designated load is a power steering unit.

* * * * *